(12) United States Patent
Feldkhun (10) Patent No.: US 9,310,184 B2
(45) Date of Patent: *Apr. 12, 2016

(54) SYSTEMS AND METHODS FOR SUPPRESSING COHERENT STRUCTURED ILLUMINATION ARTIFACTS

(71) Applicant: Daniel Feldkhun, Boulder, CO (US)

(72) Inventor: Daniel Feldkhun, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/500,088

(22) Filed: Sep. 29, 2014

(65) Prior Publication Data

US 2015/0015891 A1 Jan. 15, 2015

Related U.S. Application Data

(63) Continuation of application No. 13/645,532, filed on Oct. 5, 2012, now Pat. No. 8,848,200.

(60) Provisional application No. 61/543,784, filed on Oct. 5, 2011.

(51) Int. Cl.
| | |
|---|---|
| *G01B 9/02* | (2006.01) |
| *G01B 11/24* | (2006.01) |
| *G01B 21/04* | (2006.01) |
| *G01B 11/25* | (2006.01) |
| *G02B 27/00* | (2006.01) |

(Continued)

(52) U.S. Cl.
CPC ........ *G01B 9/02041* (2013.01); *G01B 9/02082* (2013.01); *G01B 11/2441* (2013.01); *G01B 11/25* (2013.01); *G01B 21/045* (2013.01); *G02B 27/0025* (2013.01); *G02B 27/48* (2013.01); *G02B 21/004* (2013.01)

(58) Field of Classification Search
CPC ........... G01B 9/02082; G01B 9/02094; G01B 9/02055; G01B 21/045; G01B 11/25; G02B 27/48; G02B 27/0025; G02B 21/004
See application file for complete search history.

(56) References Cited

U.S. PATENT DOCUMENTS

| 7,751,063 B2 * | 7/2010 | Dillon et al. .................. 356/511 |
| 8,184,279 B2 * | 5/2012 | Feldkhun ....................... 356/217 |
| 8,531,650 B2 * | 9/2013 | Feldkhun et al. ............ 356/4.01 |

(Continued)

OTHER PUBLICATIONS

Daniel Feldkuhn and Kelvin Wagne, "Fourier Analysis and Synthesis Tomography", Sandia Report, SAND2010-3258, May 2010.*

(Continued)

*Primary Examiner* — Kara E Geisel
*Assistant Examiner* — Violeta A Prieto
(74) *Attorney, Agent, or Firm* — Perkins Coie LLP (57) ABSTRACT

Methods and systems are provided for suppressing speckle and/or diffraction artifacts in coherent structured illumination sensing systems. A coherent radiation pattern forms an interference pattern at an illumination image plane and illuminates an object. Radiation scattered or otherwise emitted by the object is detected to produce a signal, which is integrated in time. Coherent artifact suppression is attained by using a spatial modulator, such as an acousto-optic device, to vary a phase gradient at the illumination image plane during the signal integration time. Various embodiments are provided for purposes including without limitation: preserving the depth of field of the coherent illumination; using the same acousto-optic device for pattern generation and coherent artifact suppression; electronically controlling the effective spatial coherence of the illumination system; and reducing errors due to coherent artifacts in a laser-based three dimensional imaging system.

20 Claims, 2 Drawing Sheets

(51) Int. Cl.
*G02B 27/48* (2006.01)
*G02B 21/00* (2006.01)

(56) References Cited

U.S. PATENT DOCUMENTS

| | | | | |
|---|---|---|---|---|
| 8,558,998 | B2* | 10/2013 | Feldkhun et al. | 356/217 |
| 8,848,200 | B2* | 9/2014 | Feldkhun | 356/521 |
| 2009/0284748 | A1* | 11/2009 | Melman et al. | 356/479 |
| 2012/0257197 | A1* | 10/2012 | Feldkhun et al. | 356/301 |
| 2013/0088723 | A1* | 4/2013 | Feldkhun | 356/498 |

OTHER PUBLICATIONS

Yongchang Wang, Kai Liu, Daniel L. Lau, Qi Hao, and Laurence G. Hassebrook, "Maximum SNR pattern strategy for phase shifting methods in structured light illumination," J. Opt. Soc. Am. A, vol. 27, No. 9, (2010).*

S. H. Hong, M. S. Mermelstein, and D. M. Freeman, "Reflective acousto-optic modulation with surface acoustic waves", Applied Optics 43, 2920-2924 (2004).*

D. M. Bloom, "The grating light valve: revolutionizing display technology", in Proc. SPIE, vol. 3013 (SPIE, 1997), vol. 3013, p. 165.*

* cited by examiner

SYSTEMS AND METHODS FOR SUPPRESSING COHERENT STRUCTURED ILLUMINATION ARTIFACTS

CROSS-REFERENCES TO RELATED APPLICATIONS

This application is a continuation of U.S. Utility patent application No. 13/645,532, filed Oct. 5, 2012, now U.S. Pat. No. 8,848,200, which is a non-provisional of, and claims the benefit of, U.S. Provisional Patent Application Ser. No. 61/543,784, entitled "SYSTEMS AND METHODS FOR REDUCING SPECKLE AND OTHER COHERENT ARTIFACTS," filed Oct. 5, 2011, the entire disclosures of which are incorporated herein by reference for all purposes.

BACKGROUND

High temporal and spatial coherence of laser illumination may result in unwanted artifacts and errors in a detected signal. For example, pixel edges, coating blemishes, or specks of dust on a lens in a coherent optical system may produce diffraction patterns on an illuminated object, modulating or sometimes even obscuring a desired illumination pattern and thereby producing detected signal errors, herein referred to as diffraction artifacts. Moreover, microscopic roughness on the illuminated object may produce a diffraction pattern of its own leading to spatial intensity fluctuations at the detector, herein referred to as speckle. Speckle may occur at the focal plane of an imaging lens or in free space in the near or far field of the illuminated object, and may be a dominant source of error in a laser-based illumination and detection system. Speckle and diffraction artifacts may affect image quality as well as measurement resolution and accuracy in laser-based structured-illumination three-dimensional (3D) sensing of object surfaces, in structured illumination microscopy, and in other imaging systems employing laser pattern projection, for example. There is thus a need for tools and techniques that may enable suppression of speckle and/or diffraction artifacts in coherent structured illumination sensing systems.

BRIEF SUMMARY

Certain embodiments thus provide tools and techniques for suppressing speckle and/or diffraction artifacts, which may be collectively referred to as coherent artifacts, that may address these needs. Some embodiments may provide flexible and efficient methods and systems for suppressing coherent artifacts in laser-based pattern projection and detection systems by modulating the laser illumination with an acousto-optic device or another spatial light modulator. Some embodiments may enable coherent artifact suppression without trading off the depth of field of the coherent illumination system. Some embodiments may provide methods and systems for generating and controlling interference patterns and suppressing coherent artifacts using a single acousto-optic device. Some embodiments may provide methods and systems for electronically controlling the effective spatial coherence of the illumination system. Furthermore, certain embodiments may reduce errors due to coherent artifacts in laser-based three-dimensional imaging systems and may enable high-speed, power efficient, and light-efficient pattern projection and imaging.

Some embodiments provide methods for suppressing at least one of speckle and a diffraction artifact sensed by a detector. The methods include illuminating an object with a first radiation, the first radiation forming an interference pattern at an illumination image plane, so as to produce a second radiation from the object. At least a portion of the second radiation is sensed with the detector so as to produce a signal representative of the sensed second radiation. The signal is temporally integrated over and integration period. A phase gradient is imparted across the first radiation at the illumination image plane, the phase gradient varying in time during the integration period.

Some embodiments provide systems for suppressing at least one of speckle and a diffraction artifact in a sensed radiation from an object. The systems include an illuminator illuminating an object with a first radiation. The first radiation forms an interference pattern at an illumination image plane so as to produce a second radiation from the object. Also included is a detector sensing at least a portion of the second radiation so as to produce a signal representative of the sensed radiation. A signal integrator is included, which temporally integrates the signal over an integration period. A spatial light modulator is also included which imparts a phase gradient across the first radiation. The phase gradient is at the illumination image plane and varies in time during the integration period.

Some embodiments provide systems for estimating a position of a location on an object in a three-dimensional scene. The systems suppress at least one of speckle and a diffraction artifact and include a pattern generator generating a first radiation. The systems include an illuminator which illuminates the object with the first radiation. The first radiation forms an interference pattern at an illumination image plane, so as to produce a second radiation from the object. Also included is a lens which collects at least a portion of the second radiation and forms an image of the illuminated object. The second radiation collected by the lens propagates at an angle with respect to an axis orthogonal to the illumination image plane. A detector which senses at least a portion of the image so as to produce a signal representative of the sensed portion of the image is also included. The systems include a spatial modulator which imparts a phase gradient across the first radiation. The phase gradient is at the illumination image plane and varies in time during the integration period. The systems also include a computational unit which estimates the position of a location on the illuminated object using the integrated signal.

DETAILED DESCRIPTION

This description provides example embodiments only, and is not intended to limit the scope, applicability, or configuration of the disclosed technology. Rather, the ensuing description of the embodiments will provide those skilled in the art with an enabling description for implementing embodiments of the disclosed technology. Various changes may be made in the function and arrangement of elements without departing from the spirit and scope of the disclosed technology.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may occur before, after, or concurrently with the following embodiments.

The various embodiments set forth herein may provide a more light-efficient means for suppressing speckle and/or diffraction artifacts than some other methods that may exist for reducing the spatial coherence of an illumination system using moving diffractive optical elements, such as a diffuser, in the path of a laser beam, for example. Such other methods may diffract a large portion of the incident light outside of the illumination path, whereas some embodiments of the disclosed technology may deliver most of the modulated radiation to the object while suppressing speckle and/or diffraction artifacts. Furthermore some embodiments may enable pattern projection with the full depth of field of a coherent system, but with reduced coherent artifacts, so that objects at different ranges in a three-dimensional scene may be illuminated simultaneously with a high-contrast interference pattern. Furthermore the disclosed technology may lead to more power-efficient, light-efficient, and sensitive structured illumination projectors than the incoherent projectors that may be currently in use based on lamps and even LEDs, while providing high signal fidelity. In a laser projector, illumination scattered, reflected, or transmitted by the object may be detected through a narrowband optical filter, thereby rejecting ambient light at other wavelengths and potentially allowing a structured illumination system to operate in daylight conditions with relatively low optical power, for example. Moreover, the high electrical-to-optical power conversion efficiency and high optical power densities of modern laser diodes, combined with the high light throughput of some embodiments, may enable bright, low-power, efficient structured illumination sensing systems such as wide-field high-speed three-dimensional imagers, for example.

Figure 1:
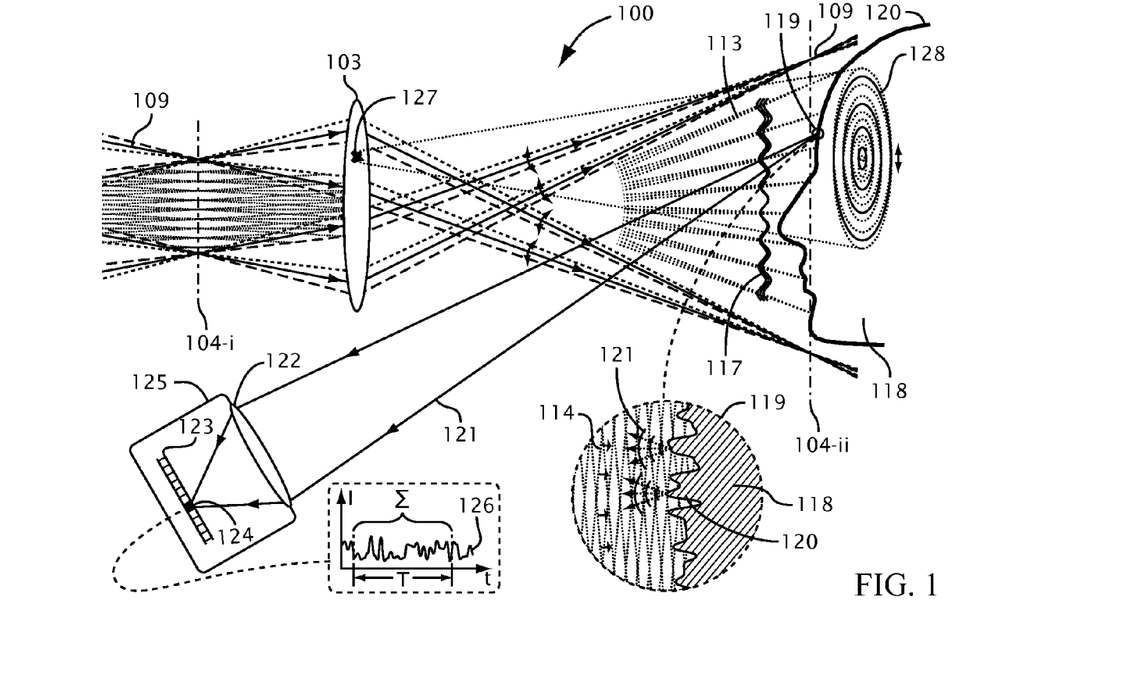
FIG. 1 illustrates a system illuminating an object using coherent radiation and suppressing speckle and/or diffraction artifacts in a time-integrated detector signal by varying a phase gradient at the illumination image plane during the detector integration time.

FIG. 1 illustrates a coherent structured illumination and detection system 100. As may be known by some, when an object 118 is illuminated with coherent radiation 109, microscopic features on the surface 120 of the object may create random-like spatial intensity fluctuations in the radiation 121 scattered by the object . These intensity fluctuations, known by some as speckle, may occur in the near field, in the far field, in an image and/or in an optical transform of the object and may introduce errors in the signal produced by an intensity-sensitive detector exposed to the radiation 121 from the object. For example, the scattered intensity detected by a pixel 124 in a detector array 123 at the focal plane of a camera 125 may depend not only on the reflectivity of the surface at the corresponding resolvable spot 119 on the object, but also on the intensity of the interference at the pixel of the wavefronts 121 scattered by different microscopic surface features within the resolvable spot 119 and collected by the camera lens 122. When the surface 120 is rough compared to the illumination wavelength, the relative phases of the scattered wavefronts 121 may be randomly distributed resulting in a random speckle distribution modulating the image formed on the detector array 123, for example. The speckle modulation contrast may depend on the object roughness, the effective numerical aperture (NA) of the detector and the corresponding size of the resolvable spot, the illumination wavelength, the spatial and temporal coherence of the illumination, and other factors (e.g., see J. W. Goodman, "Some Fundamental Properties of Speckle", J. Opt. Soc. Am., Vol. 66, No. 11, 1976, which is incorporated herein by reference in its entirety). In some cases speckle may be detrimental to the quality of images formed with coherent illumination. Merely by way of example, speckle may be known by some to reduce the resolution, accuracy, and/or precision of some three-dimensional imaging techniques employing coherent structured illumination and an off-axis detector to triangulate three-dimensional locations on an object.

Moreover, as may be known by some, when an object 118 is illuminated with coherent radiation 109, obstructions and/or phase perturbations in the illumination path such as dust particles on lens surfaces, coating blemishes, and lens edges, merely by way of example, may produce unwanted diffraction artifacts in the image. For example, a dust particle 127 on an illumination lens 103 may produce a diffraction ring pattern 128 on the object 118. Such artifacts may be detrimental to the quality of images formed with coherent illumination. Merely by way of example, illumination diffraction artifacts may be known by some to reduce the resolution, accuracy, and/or precision of some three-dimensional imaging techniques employing coherent structured illumination and an off-axis detector to triangulate three-dimensional locations on an object. Various embodiments of the disclosed technology may enable suppressing speckle and/or illumination diffraction artifacts in coherent structured illumination and detection systems.

In some embodiments an object 118 may be illuminated with coherent radiation 109 forming an interference pattern 117 at an illumination image plane 104-ii and a microscopically-rough object surface 120 may in response to the illumination scatter radiation 121 producing unwanted speckle at a detector 124. The speckle may be reduced by integrating the detector signal (which may be a linear function of the incident intensity 126) in time and varying the angle of the illumination 113 (using a deflector or another spatial phase modulator, for example) so as to produce a time-varying phase gradient across the first radiation at an illumination image plane during the integration time. The illumination plane may be a focal plane of a lens such as lens 103 in the illumination optical path where the interference pattern 117 or its image may be formed, such as conjugate planes 104-i and 104-ii. In some embodiments, the time-varying phase gradient may be a substantially linear component of the phase wavefront of radiation 109 and may result in a varying orientation of the interference pattern 117. The variation of the interference pattern orientation during the integration time may be very slight and in some embodiments may be a small fraction of a degree, for example. The temporal integration may be accomplished by accumulating and reading out electronic charge within a camera pixel or in post-processing, while the phase gradient may be varied using a deflector located at another conjugate image plane of the illumination system such as 104-i, for example. In some embodiments where the detector 124 comprises a pixel of a high-speed camera 125, the integration time may be several milliseconds and the orientation of the interference pattern 117 may sweep through one or more cycles during this time.

The time-varying phase gradient at an illumination image plane may be also be considered as a time-varying angle of incidence of a coherent wavefront 114 illuminating a resolvable spot 119 on the object surface 120. Since the relative phases between wavefronts 121 scattered by different surface features within a resolvable spot 119 may change as a function of the wavefront incidence angle 113, the intensity 126 due to the interference of the scattered wavefronts 121 at a pixel 124 imaging a resolvable spot 119 may also fluctuate during the pixel integration time. The incoherent summation $\Sigma$ of these temporal speckle fluctuations 126 during the detector integration time T may result in reduced errors in the integrated detector signal due to speckle. Speckle de-correlation due to illumination incidence angle diversity, and hence the effectiveness of this method of speckle suppression, may depend on the interplay of several factors that may include the variation of the illumination incidence angle, the NA of the imaging lens, the source wavelength $\lambda$, and the standard deviation $\sigma_z$ of the surface height fluctuations within a resolvable spot, without limitation. However, in general the degree of speckle suppression may be expected to be commensurate with that attainable by using an extended spatially-incoherent source with a bandwidth of $\Delta\lambda < \sim \lambda^2/2\sigma_z$ producing a comparable angular diversity of illumination at the object (which in both cases may be limited by the illumination objective lens 103). In some cases, where $\sigma < \sim 15\lambda$, and the angular diversity is objective-limited, speckle suppression may be commensurate with that attainable with an LED illumination source, merely by way of example. It has been observed in practice that an angular diversity of only $\sim 1/100$ of a degree may be sufficient to marginalize speckle in images of some common surfaces, for example.

In some embodiments, a contaminant such as a dust particle 127 on an illumination lens 103 may produce a diffraction artifact 128 on the object 118 resulting in an unwanted spatial intensity modulation at a detector 124. The method of suppressing speckle by introducing a time-varying phase gradient across an illumination image plane, such as plane 104-i, during the detector integration time may also be used to suppress diffraction artifacts such as artifact 128. The diffraction artifact suppression may be due to a time-varying angle of incidence of the first radiation 109 on the dust particle 127 and a resulting time-varying shift of the diffraction artifact 128 at the object during the detector integration time, which may effectively blur the unwanted diffraction artifact 128 but not the desired interference pattern 117. The effectiveness of this diffraction artifact suppression may depend on the interplay of several factors that may include variation of the radiation incidence angle on the contaminant 127, location of the optical surface on which the contaminant resides, the size and structure of the diffraction artifact, and the distance from the contaminant to the object 118, without limitation. For example, if the phase gradient is varied along a plane, a diffraction pattern with structure that varies primarily in a direction orthogonal to this plane may not be suppressed at all. On the other hand, many types of diffraction patterns may be effectively suppressed using this method. For example, a one-degree variation of the radiation incidence angle on a dust particle 127 may cause a diffraction artifact shift variation of ~17.5 millimeters on an object 118 that is one meter away from the particle, which may blur and suppress all but the largest diffraction artifacts.

The speckle and diffraction artifact reduction set forth above may increase the effective spatial coherence of the illumination system on the time scale of the temporal resolution of the integrated detector signal. Therefore, the speckle and diffraction artifact visibility may generally be estimated by considering a spatially incoherent (but temporally coherent) system providing the same angle diversity of illumination.

It should be apparent to those skilled in the art that a variety of implementations of said embodiments is possible within the spirit and scope of the disclosed technology. The object 118 may be located at a distance from an illumination objective 103, as in a ranging system, or close to it, as in a microscope. There may be one or more illumination image planes, such as 104-i and 104-ii, which may be formed using one or more lenses or other optical elements arranged in a telecentric or a non-telecentric configuration. The object may have a continuous surface 120, may have discontinuous surfaces, and/or may comprise distinct particles. The features generating the interfering wavefronts 121 and/or receiving the illumination 109 may be located at the surface or inside the object. The radiation 121 from the object may be scattered, reflected, transmitted, or in the case when only diffraction artifacts are suppressed, may be fluoresced. The radiations 109 and 121 may be visible and/or invisible and illuminating radiation 109 may have only partial spatial and/or spectral coherence.

The detector 124 may be located at the focal plane of an imaging lens 122 as shown, or in an optical transform plane, in the near-field, or in the far-field of the object 118, where coherent wavefronts 121 may interfere to produce a speckle pattern and/or where diffraction artifacts in the illumination may produce unwanted detected intensity variations. The speckle at the detector may be due to features within a resolvable spot, as in subjective speckle on an imaging detector, or may be due to features distributed on the object, as in objective speckle on a far-field detector in a tomographic system, for example. Furthermore the speckle-generating object features may not lie on a surface, may be distributed within a volume, and/or may comprise distinct particles. The detector 124 may be a pixel of a detector array 123 or may be a single-element detector such as a photodiode.

The time integration of the detector signal may occur as part of accumulation and readout of electrons within a pixel, or may be implemented using an electronic filter or by summing detector data within a computer (e.g. by image stacking), for example. The integration time may fall in a wide range of timescales: from nanoseconds in the case of high-speed detection to seconds or longer in the case of low-light imaging, without limitation. The speckle distribution at the detector and/or the temporal intensity variation 126 at the detector during the integration time may be random or non-random and may depend on the characteristics of the illuminated object. A diffraction artifact may be produced by a contaminant in the illumination system, such as a dust particle, or may be due to lens edges, spatial light modulator pixel edges, coating blemishes, occlusions, or other obstructions or phase perturbations. Moreover, the source of a diffraction artifact may be located anywhere in the illumination optical path, although if it is located at a conjugate illumination image plane, such as 104-i, diffraction artifact suppression may not be effective. The time-varying phase gradient may be continuous or may be segmented, as may be the case if it is imparted by a spatial modulator comprising an array of discrete elements, such as a micromirror array. It also need not be linear since the action of a varying nonlinear phase gradient may correspond to the action of a linear phase gradient within a small neighborhood at the illumination image plane sensed by a detector element. The time-varying phase gradient may be varied along a plane or a different locus and may not entail variation of the illumination incidence angle. For example, in some embodiments the phase gradient in an illumination image plane may be varied by precessing a deflector such that the illumination incidence angle remains constant but the direction of the illumination varies, which may improve suppression of some types of directional diffraction artifacts. Variation of the phase gradient may be accomplished by other means, such as a spatial phase modulator, for example, and may be imparted at various locations in the illumination optical path. Merely by way of example, the interference pattern 117 may be generated by a plurality of fibers sources located in an illumination Fourier transform plane and the phase gradient at an illumination image plane, such as 104-$i$ or 104-$ii$, may be introduced by a lateral vibration of the fiber sources. The interference pattern 117 may be stationary or may be moving during the integration time of the detector, as may be the case for an interference pattern generated by an acousto-optic device, for example.

Figure 2:
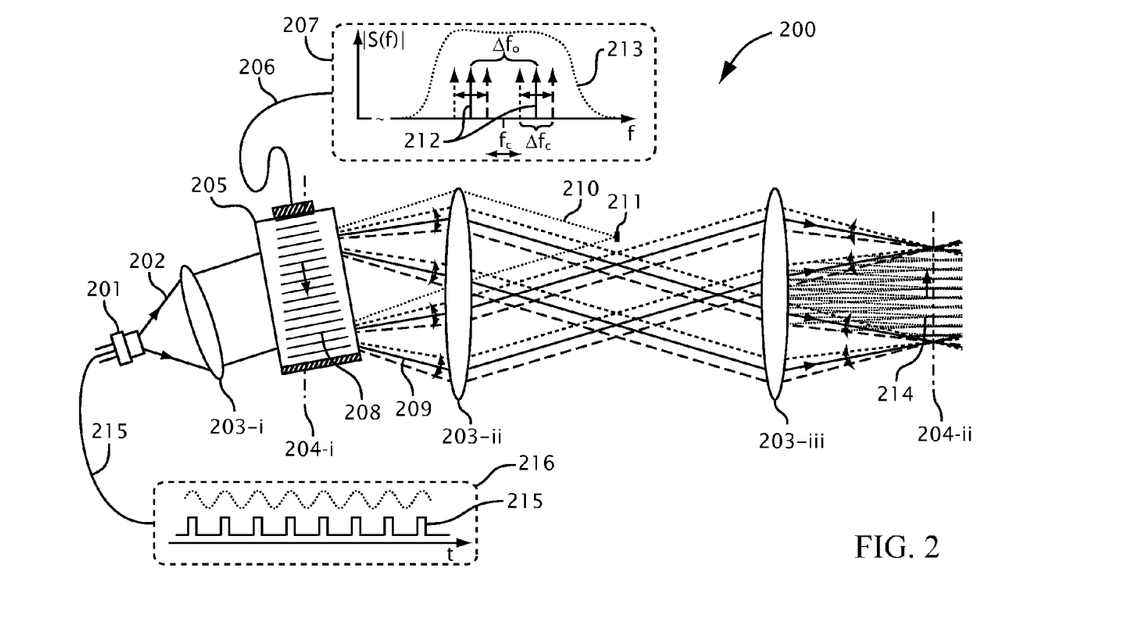
FIG. 2 illustrates a system where an acousto-optic device illuminated by a temporally-modulated coherent laser beam may be used to generate an interference pattern and to introduce a time-varying phase gradient at the illumination image plane.

FIG. 2 illustrates a system 200 which may be used to generate an interference pattern 214 and/or to impart a time-varying phase gradient in an illumination plane, such as plane 204-$ii$. In some embodiments, system 200 may be used to generate the first radiation 109 in various embodiments of FIG. 1, and the plane 204-$ii$ may be coincident with an illumination image plane, such as plane 104-$i$, of FIG. 1. A source 201 of a first coherent radiation 202 may be collimated using a lens 203-$i$ and may illuminate an acousto-optic device 205, which may be located at a conjugate illumination image plane 204-$i$. In some embodiments the acousto-optic device 205 may be a Bragg cell. A Bragg cell may be an existing commercially-available device that may include an acoustic transducer bonded to an optical crystal and driven with an electronic signal 206 to produce an acoustic pressure wave moving through the crystal at the velocity of sound. The acoustic pressure wave may create via a photoelastic effect a traveling refractive index perturbation 208 within the crystal diffracting a second radiation 209 and transmitting a portion of the first radiation 210 which may be blocked by a mask 211. As illustrated in the drive signal power spectrum 207, the drive signal may comprise a plurality of frequencies 212, resulting in a superposition of traveling sinusoidal refractive index perturbations 208 within the Bragg cell 205 and producing a second radiation 209 comprising a plurality of wavefronts. The diffracted radiation may be transmitted using one or more lenses, such as lenses 203-$ii$ and 203-$iii$, to produce a interference pattern 214 at an illumination image plane 204-$ii$. The interference pattern 214 may be rapidly traveling due to different Doppler shifts imparted by the Bragg cell on the wavefronts comprising the second radiation 209.

In some embodiments the amplitude of the interference pattern may be modulated in time to stop or slow down the apparent motion of the interference pattern and reduce blurring of a time-integrated detector signal due to the pattern motion. In some embodiments the amplitude modulation of the interference pattern may be effected by driving the source 201 of the first radiation 202, such as a laser diode, with an amplitude-modulated signal 215. Merely by way of example, the Bragg cell 205 may be driven with an electronic signal 206 comprising a pair of RF frequencies 212 as illustrated in the drive signal RF power spectrum 207, producing a traveling sinusoidal interference pattern 214. As illustrated in the power spectrum 207 and in box 216, the laser diode 201 may be amplitude-modulated with a pulsed drive signal 215 at the RF difference frequency $\Delta f_0$, thereby stopping the apparent motion and setting the phase of the interference pattern 214.

In some embodiments the phase gradient of the second radiation at an illumination image plane 204-$ii$ may be varied by modulating a carrier frequency $f_c$ of the Bragg cell drive signal 206, as illustrated in the RF power spectrum 207. The carrier frequency modulation may be a repetitive frequency sweep, for example. The bandwidth $\Delta f_c$ of the frequency modulation may determine the phase gradient variation and the angular diversity of the second radiation at an illumination image plane and may be determined at least in part by the Bragg cell frequency response 213. In some embodiments, the RF modulation bandwidth $\Delta f_c$ may be adjusted to trade off the degree of speckle and/or diffraction artifact suppression (and the effective spatial coherence of the illumination system) for depth of field of the illumination or a reduced integration time (in the case of fast modulation rates), for example. For instance, high-bandwidth carrier frequency modulation may provide the most speckle suppression, but may reduce the depth of field and/or may require a longer integration time to accommodate a sweep rate of the driver in some embodiments. Merely by way of example, in one embodiment a Bragg cell 205 may be driven with a pair of tones at 42.5 MHz and 47.5 MHz, producing a moving sinusoidal interference pattern 214 at an illumination image plane 104-$i$ of the structured illumination system of FIG. 1, a laser diode source 201 may be amplitude-modulated at the 5 MHz difference frequency $\Delta f_0$ to stop the apparent motion of the interference pattern 214, and the Bragg cell drive signal center frequency $f_c$ may be swept over a bandwidth of 20 MHz with a sweep time of 500 µs is to suppress speckle and diffraction artifacts in an image of a 25 cm diameter surface patch on an object 118 at a distance of 1m from the objective lens 103 captured by a CCD camera 125 with an integration time of ~10 ms.

It should be apparent to those skilled in the art that a variety of implementations of said embodiments is possible within the spirit and scope of the disclosed technology. For example, the Bragg cell may comprise a crystal, a glass, a liquid, a plastic, or another acousto-optic medium. In other embodiments the acousto-optic device 205 may be a surface-acoustic-wave modulator, may reflect the incident first radiation, and may diffract the second radiation 209 by means of a traveling surface wave instead of the traveling refractive index perturbation 206 of the Bragg cell. In some embodiments, such as a microscope, the object 118 of FIG. 1 may be placed directly in an image plane 204-$ii$. The diffracted second radiation 209 may comprise the $1^{st}$ diffraction order and/or other diffraction orders, including the $0^{th}$ order. In some embodiments the amplitude modulation may be accomplished by modulating the radiation source 201, by using a modulator, such as a shutter or an acousto-optic modulator, modulating the first radiation 202, the second radiation 209, or the radiation 121 from the object, or alternatively by electronically modulating the detected signal. The amplitude modulation may be synchronous with the difference frequency $\Delta f_0$ to stop the apparent motion of the interference pattern, or asynchronous to merely slow it down, and may be pulse-like, sinusoidal, or of another functional form. The modulation of the carrier frequency $f_c$ may be non-monotonic and/or non-linear. The spectrum 207 of the drive signal 206 may comprise multiple distinct frequencies or may be continuous and the resulting interference pattern 214 may be periodic or aperiodic. In some embodiments, merely by way of example, the drive signal 206 may comprise two frequencies varying in opposite directions with time and the amplitude modulation signal 215 may comprise narrow pulses with a period exceeding the propagation time of the acoustic wave 208 across the first radiation 202 to produce a chirped interference pattern 214 having a spatially-varying period. Multiple acousto-optic devices may be used in tandem or may be located in conjugate illumination image planes to produce two-dimensional and three-dimensional illumination patterns and/or to separately control pattern generation and deflection. Moreover, the carrier frequencies $f_c$ of multiple non-coplanar acousto-optic devices may be modulated to effect a non-planar variation of the phase gradient. In some embodiments a single multi-dimensional acousto-optic device may be used wherein multiple traveling perturbations may travel in different directions. In some embodiments a spatial light modulator such as a micromirror array, a liquid crystal array, or a grating light valve may be located in one conjugate illumination image plane and used to generate the interference pattern 214, while an acousto-optic device 205 may be used in another conjugate illumination image plane to introduce the time-varying phase gradient. In some embodiments a different kind of spatial modulator, such as a tilting mirror, a micromirror array, a grating light valve, or a liquid crystal device, may be used to vary the phase gradient at an illumination image plane in place of an acousto-optic device 205.

Figure 3:
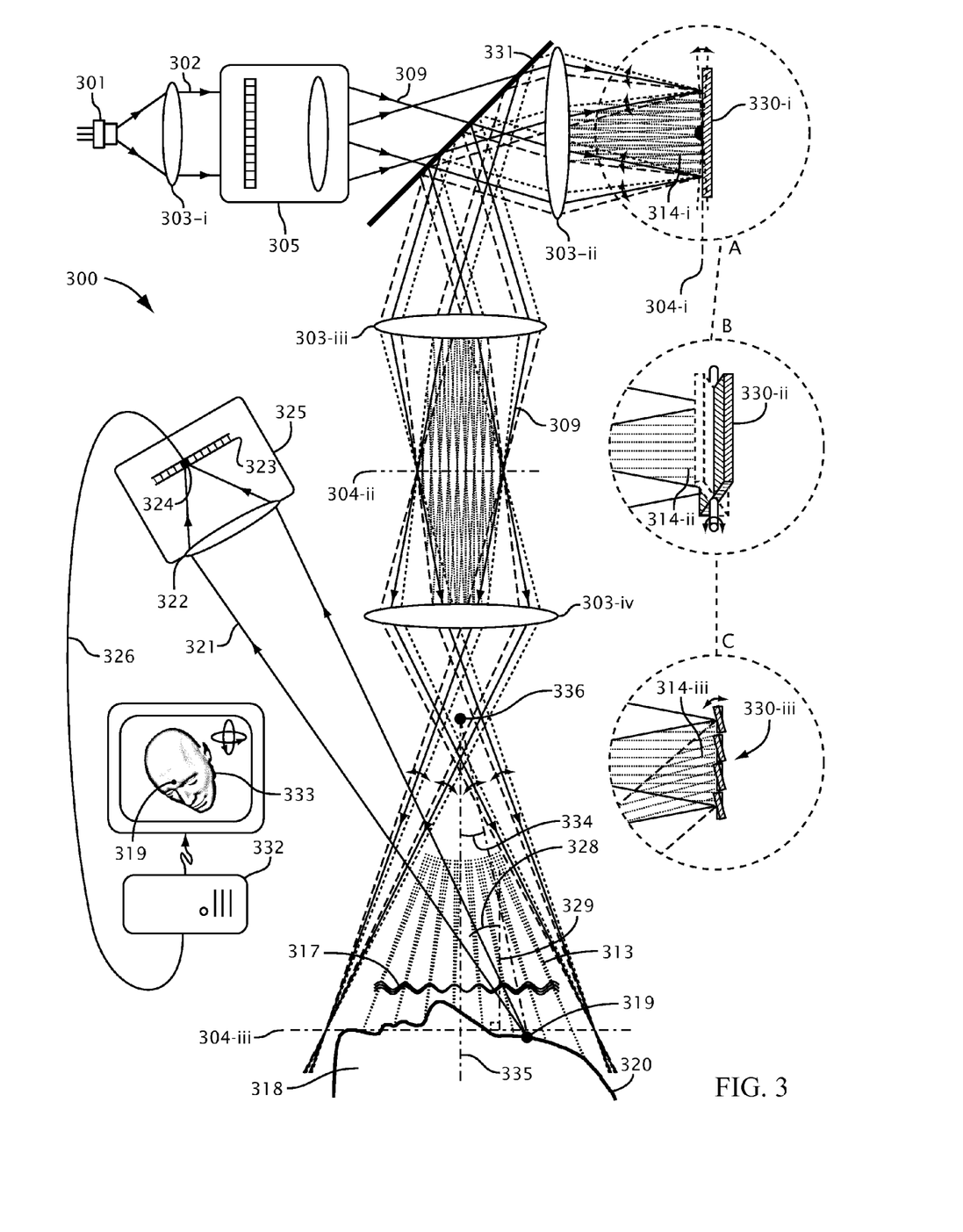
FIG. 3 illustrates a coherent structured illumination system that may be used for estimating a location on an object in a three-dimensional scene, the system employing an off-axis detector and a deflector in a conjugate illumination image plane to suppress speckle and/or diffraction artifacts in the time-integrated detector signal.

FIG. 3 illustrates a system 300 which may be utilized for estimating a location 319 on an object 318 in a three-dimensional scene. A source 301 of a first coherent radiation 302 (which may be collimated using a lens 303-*i*) may illuminate a pattern generator 305 generating from the first radiation a second radiation 309 forming an interference pattern 317 at an illumination image plane 304-*iii* (and in some embodiments at other conjugate illumination image planes such as planes 304-*i* and 304-*ii*). In some embodiments the pattern generator 305 may comprise an acousto-optic device 205 used in various embodiments of FIG. 2. In some embodiments the pattern generator 305 may comprise a spatial light modulator such as a micromirror array or a liquid crystal array, for example. The second radiation 309 may illuminate the object 318 using lenses such as 303-*ii*, 303-*iii* and 303-*iv*. The object 318 may produce a third radiation 321 in response to the illumination, and a portion of the third radiation 321 propagating at an angle 328 with respect to an illumination image plane normal 329 may be sensed by a detector 324. The detector signal 326 and a processor 332 may be used to estimate a position of the location 319 on the illuminated object 318 from the detector signal. In some embodiments a plurality of location positions on the object may be estimated to form a 3D reconstruction 333 of an object surface 320. A 3D position of the location 319 may be estimated by processing signals from one or more detectors 324 due to one or more illumination patterns 317 to establish an angle 334 between an illumination axis 335 and the location from a reference point such as point 336. The location of the detector 324 with respect to the reference point 336, which may be known, may then be utilized to estimate a position of the location 319 on the object 318 by triangulation. The position of the location 319 may be estimated using various methods employing various illumination patterns, some of which may be known in the prior art. For example, FIGS. 6-9 in U.S. patent application Ser. No. 12/499,758, which is hereby incorporated herein by reference in its entirety, may illustrate several embodiments of such a 3D location estimation method utilizing frequency-diverse sinusoidal patterns or shifted swept-period chirp patterns.

In some embodiments the detector 326 signal may be integrated in time and a deflector (which may be understood to be a type of spatial modulator), such as a tilting mirror 330-*i*, may impart a time-varying phase gradient in an illumination image plane, such as planes 304-*i*, 304-*ii*, and 304-*iii*, during the integration time, so as to suppress speckle and/or diffraction artifacts in the detector signal in accordance with various embodiments of FIG. 1. In some embodiments a beam splitter 331 may be used to direct the second radiation reflected by the deflector 330-*i* towards the object 318. In some embodiments, the illumination image plane 304-*ii* may coincide with the illumination image plane 104-*i* of FIG. 1, for example. Outside of the illumination image plane, the variation of the illumination incidence angle 313 during the integration time may result in an phase mismatch between the interference patterns, such as patterns 317 and 314-*i*, produced at each instance of time. This phase mismatch may increase with distance from the illumination image plane and may limit the depth of field of the second radiation 309 illuminating the object 318. The depth of field may be commensurate with the depth of field of a spatially-incoherent system producing a comparable angular diversity of illumination. In some embodiments, where an interference pattern, such as patterns 317 and 314-*ii*, varies along a direction, it may be possible to increase the depth of field of the second radiation 309 by using a deflector 330-*ii* which varies the phase gradient in an illumination image plane, such as plane 304-*i*, along a plane substantially orthogonal to the direction of the interference pattern variation, as illustrated in Inset B. In these embodiments, speckle and diffraction artifacts may still be suppressed in accordance with the various embodiments of FIG. 1, however the depth of field may not be limited by the angle diversity imparted by the deflector 330-*ii* and may be commensurate with the large depth of field attainable without using a deflector, which may be of benefit in illuminating and sensing a 3D scene. In some embodiments the deflector 330-*iii* may comprise a spatial modulator such as a micromirror array, which may diffract radiation 309 into a diffraction order in one position and retro-reflect light in another position, as illustrated in Inset C. In these embodiments the variation of the phase gradient may be discontinuous and in some embodiments the orientation of the interference pattern, such as patterns 317 and 314-*iii*, may switch between two orientations and two discrete speckle intensities may be averaged during the detector signal integration time.

It should be apparent to those skilled in the art that a variety of implementations of said embodiments is possible within the spirit and scope of the disclosed technology. For example, in some embodiments and acousto-optic device, such as the Bragg cell 205 illustrated in FIG. 2, may be used as the deflector 330-*i*, 330-*ii* or 330-*iii* and may transmit the second radiation 309 instead of reflecting it. The deflector may comprise another type of spatial modulator. For example, a programmable grating device such as the Silicon Light Machines Grating Light Valve may be used to alternatively reflect and diffract radiation in place of the micromirror spatial modulator 330-*iii*. In some embodiments, a liquid crystal spatial phase modulator may be programmed to impart a phase gradient on the radiation 309. In such embodiments employing a liquid crystal array, an image of a liquid crystal pixel at the illumination plane 304-*iii* may need to be substantially smaller than the location 319 imaged by a camera pixel 324 for effective speckle suppression. In some embodiments the deflector may vary the phase gradient along a non-planar locus and may comprise multiple deflectors. The deflector 330-*i*, 330-*ii* or 330-*iii* may be controlled by a processor 332, or may be free-running Methods for estimating a position of a 3D location 319 may use only a single detector 324, as in the case of pixel-independent methods which may be described in U.S. patent application Ser. No. 12/499,758, which is hereby incorporated herein by reference in its entirety, or may utilize signals from multiple pixels in a detector array 323 at the focal plane of a lens 322 of a camera 325, the pixels sensing radiation 321 from a plurality of locations 319 on the object 318. The object 318 may be discontinuous and the location may not be on a surface 320.

Having described several embodiments, it will be recognized by those of skill in the art that various modifications, alternative constructions, and equivalents may be used without departing from the spirit of the disclosed technology. By way of example, several such variations are set forth here, but this identification of potential variations is not intended to be exhaustive, and other variations will be evident for those of skill in the art.

For instance, while the optics have been described for particular types of systems in the illustrative embodiments, the principles of the disclosed technology may more generally be implemented with reflective optics, transmissive optics, or combinations thereof.

The principles set forth above may also be applied to spatially coherent, but temporally incoherent narrowband sources such as a superluminescent diode, a pulsed laser, a filtered super-continuum source, or a multi-wavelength laser which may produce speckle and/or diffraction artifacts in some frequency bands. Furthermore, the time-varying phase gradient may be spectrally-dependent.

The arrangements illustrated in the drawings and described above are simple so that the principles of operation will be evident, but it will be appreciated that other systems may be implemented in a more complex fashion, such as by involving a greater number of lenses than shown and/or by involving additional conjugate optical planes. Although a single detector has been described above for most embodiments, it will be understood that parallelized embodiments using multiple detectors to look at different parts of the object, different spectral bands, different polarizations, etc. are also within the intended scope of the disclosed technology, and may be used in various embodiments where only a single detector has been described.

In some illustrative embodiments, only a pair of interfering beams has been shown, but the same principles typically also apply when many beams or when a continuous spatially modulated wavefront is diffracted. Such alternative embodiments are also within the intended scope of the disclosed technology.

In addition, the above elements may merely be a component of a larger system, wherein other rules may take precedence over or otherwise modify the application of the disclosed technology. Also, a number of steps may be undertaken before, during, or after the above elements are considered.

Accordingly, the above description should not be taken as limiting the scope of the disclosed technology, which is defined in the following claims.

What is claimed is:

1. A method of suppressing at least one of speckle and a diffraction artifact sensed by a detector, the method comprising:
    illuminating an object with a first radiation, the first radiation forming an interference pattern at an illumination image plane, and the object producing a second radiation in response to the first radiation;
    imparting a phase gradient across the first radiation at the illumination image plane, the phase gradient varying in time during an integration period;
    sensing at least a portion of the second radiation with the detector so as to produce a signal representative of the sensed second radiation; and
    temporally integrating the signal over the integration period so as to reduce a deviation of the signal due to at least one of speckle and a diffraction artifact.

2. The method recited in claim 1 further comprising:
    varying the phase gradient using at least one of a tilting mirror, a micromirror array, a grating light valve, and a liquid crystal spatial light modulator.

3. The method recited in claim 1 further comprising:
    varying the phase gradient using an acousto-optic device driven with a drive signal, the acousto-optic device comprising at least one of a Bragg cell and a surface-acoustic-wave modulator, and wherein the phase gradient is varied by modulating the drive signal.

4. The method recited in claim 3 further comprising:
    adjusting a modulation bandwidth of the drive signal so as to control at least one of a speckle contrast, a diffraction artifact contrast, a depth of field of the illumination, and a minimum integration period.

5. The method recited in claim 3 further comprising:
    controlling, with the acousto-optic device, at least one of the structure, scaling, direction, and phase of the interference pattern.

6. The method recited in claim 5 further comprising:
    causing the interference pattern to move; and
    temporally modulating an amplitude of at least one of the first radiation, the second radiation, and the detector signal.

7. The method recited in claim 1 further comprising:
    causing the interference pattern to vary along a first direction orthogonal to the phase gradient so as to preserve a depth of field of the first illumination.

8. The method recited in claim 1 wherein sensing the at least a portion of the second radiation comprises generating a plurality of electrons in response to the sensed radiation, and wherein integrating the signal comprises accumulating and reading out the plurality of electrons.

9. The method recited in claim 1 wherein the signal is integrated in time in post-processing.

10. An apparatus for suppressing at least one of speckle and a diffraction artifact in a sensed radiation from an object, the apparatus comprising:
    a means for illuminating an object with a first radiation, the first radiation forming an interference pattern at an illumination image plane, and the object producing a second radiation in response to the first radiation;
    a means for imparting a phase gradient across the first radiation at the illumination image plane, the phase gradient varying in time during an integration period;
    a means for sensing at least a portion of the second radiation so as to produce a signal representative of the sensed second radiation; and
    a means for temporally integrating the signal over the integration period so as to reduce a deviation of the signal due to at least one of speckle and a diffraction artifact.

11. The apparatus of claim 10 wherein the means for imparting a phase gradient comprises at least one of a tilting mirror, a micromirror array, a grating light valve, and a liquid crystal spatial light modulator.

12. The apparatus of claim 10 wherein the means for imparting a phase gradient comprises an acousto-optic device, the acousto-optic device comprising at least one of a Bragg cell and a surface-acoustic-wave modulator.

13. The apparatus of claim 12 wherein the acousto-optic device also controls at least one of the structure, scaling, direction, and phase of the interference pattern.

14. The apparatus of claim 13 further comprising a means for temporally modulating the amplitude of at least one of the first radiation, the second radiation, and the detector signal.

15. The apparatus of claim 10 wherein the means for sensing at least a portion of the second radiation comprises a pixel of a sensor array, the signal comprises electrons produced within the pixel in response to the sensed radiation, and the means for temporally integrating the signal comprises the pixel accumulating the electrons and a sensor array circuit reading out the accumulated electrons.

16. The apparatus of claim 10 wherein means for temporally integrating the signal comprises at least one of an electronic filter and a computer.

17. An apparatus for estimating a position of a location on an object in a three-dimensional scene, the apparatus suppressing at least one of speckle and a diffraction artifact and comprising:
- a means for generating a first radiation;
- a means for illuminating the object with the first radiation, the first radiation forming an interference pattern at an illumination image plane, and the object producing a second radiation in response to the first radiation;
- a means for imparting a phase gradient across the first radiation, the phase gradient being at the illumination image plane and varying in time during an integration period;
- a means for collecting at least a portion of the second radiation and forming an image of the illuminated object, the radiation portion propagating at an angle with respect to an axis orthogonal to the illumination image plane;
- a means for sensing at least a portion of the image so as to produce a signal representative of the sensed image portion;
- a means for temporally integrating the signal over an integration period so as to reduce a deviation of the signal due to at least one of speckle and a diffraction artifact; and
- a means for estimating the position of a location on the illuminated object using the temporally integrated signal.

18. The apparatus of claim 17 wherein the means for imparting a phase gradient comprises an acousto-optic device, the acousto-optic device comprising at least one of a Bragg cell and a surface-acoustic-wave modulator.

19. The apparatus of claim 18 wherein the means for generating a first radiation and the means for imparting a phase gradient comprise the same acousto-optic device controlling at least one of the structure, scaling, direction, and phase of the interference pattern, the apparatus further comprising a means for temporally modulating the amplitude of at least one of the first radiation, the second radiation, and the detector signal.

20. The apparatus of claim 17 wherein the interference pattern varies along a direction, and wherein the time-varying phase gradient is along a plane substantially orthogonal to said direction so as to preserve a depth of field of the second radiation.

* * * * *